United States Patent [19]

Barrett

[11] 3,801,785

[45] Apr. 2, 1974

[54] SPATIALLY MODULATED IMAGING SYSTEM

[75] Inventor: Harrison H. Barrett, Lexington, Mass.

[73] Assignee: Raytheon Company, Lexington, Mass.

[22] Filed: Nov. 1, 1972

[21] Appl. No.: 302,992

[52] U.S. Cl. ................. 250/321, 250/323, 250/460, 250/482
[51] Int. Cl. ................................................ G01t 1/18
[58] Field of Search ............. 250/51.5, 53.1, 237 G, 250/475, 482, 320, 321, 86; 350/162 ZP, 162 SF

[56] References Cited
UNITED STATES PATENTS

| | | | |
|---|---|---|---|
| 1,626,306 | 4/1927 | St. John | 250/86 |
| 2,679,474 | 5/1954 | Pajes | 250/53.1 |
| 1,624,443 | 4/1927 | St. John | 250/51.5 |
| 2,925,497 | 2/1960 | Bessen | 250/51.5 |
| 3,407,296 | 10/1968 | Armstrong | 250/51.5 |
| 3,569,997 | 3/1971 | Lehovec | 250/237 G |
| 3,669,528 | 6/1972 | Richardson | 250/237 G |
| 3,402,292 | 9/1968 | Baecklund | 250/86 |
| 3,515,874 | 6/1970 | Bens | 250/86 |

*Primary Examiner*—James W. Lawrence
*Assistant Examiner*—Harold A. Dixon
*Attorney, Agent, or Firm*—Herbert W. Arnold; Joseph D. Pannone; Milton D. Barlett

[57] ABSTRACT

Noncoherent radiation, such as X-rays, is spatially coded, directed through an object and spatially detected to form a spatially coded pattern, from which an image of the object may be reconstructed. The X-ray source may be formed by X-ray fluorescence and subtraction of the holographic images formed by two sources having energy levels predominantly above and below the maximum absorption range of an agent in the object may be used to enhance contrast in the reproduced image. Constant spatial frequency coding of the source may be used to produce a spatial carrier frequency to enhance detection of low spatial frequency components of the spatially coded pattern so that images may be a more easily reconstructed such as the optical reconstruction of spatially code formed by the off-center section of a Fresnel zone pattern by converting the detected intensity pattern to a diffraction or phase pattern.

28 Claims, 5 Drawing Figures

SPATIALLY MODULATED IMAGING SYSTEM

RELATED APPLICATIONS

U.S. Pat. application Ser. No. 77,459, filed Oct. 2, 1970 by Harrison H. Barrett, entitled "Imaging System Utilizing Spatial Coding," and application Ser. No. 250.224, filed May 4, 1972 now U.S. Pat. No. 3748470 by Harrison H. Barrett, entitled "Zone Plate Imaging System," both assigned to the same assignee as this invention, are hereby incorporated herein by reference and made a part of this disclosure.

BACKGROUND OF THE INVENTION

Practical X-ray systems have heretofore been formed with X-ray tubes in which high speed electrons strike a target with sufficient velocity to produce X-rays which are projected through an object to be X-rayed and are detected by a detection device, such as a film or image intensifier tube having a large area photocathode. The spatial definition of such systems is limited by the fact that to produce practical intensities of X-rays for most applications, a sufficient current of electrons must strike the X-ray tube anode to cause the anode temperature to rise at the point of electron impact to near melting temperature and, hence, further increase in the X-ray intensity requires that the electron beam be spread out, thereby resulting in the X-ray source being no longer a point source. Expedients such as rotating anodes improve this situation somewhat but are complicated and expensive.

In addition, in X-ray systems a limiting factor in many situations is the secondary radiation known as Compton scattering in which portions of the body being X-rayed act as point sources emitting radiation in all directions, generally at a lower energy level than the primary radiation.

SUMMARY OF THE INVENTION

The aforementioned copending patent application Ser. No. 77,459 discloses in FIG. 8 diagrammatically a spatially coded source of radiation such as spatially deposited zones of radioactive material. "Spatial coding of a radiation pattern" as used throughout the specification and claims means variation of the amplitude of the radiation pattern as a function of location in accordance with a predetermined code. This invention discloses X-ray systems in which the coded source is preferably derived from an X-ray tube having a target bombarded with electrons to produce X-rays. X-rays from the target preferably have their energy converted to a narrower energy band from that emitted from the X-ray tube anode by X-ray fluorescence to produce a spatially extensive source of X-rays substantially concentrated in a region of one energy level. "Fluorescent X-rays" as used throughout the specification and claims means X-rays produced from a source in response to excitation of the source by radiation of a higher energy level. Emissions from the fluorescent source are spatially coded, for example, by passing through a spatially coded masking plate hereinafter referred to as a zone plate. Preferably, the zone plate is positioned adjacent to the fluorescent source such that the source of X-rays appears to be spatially coded. An object to be X-rayed is then positioned between the spatially coded source and a detector, such as a film, on which a shadowgraph spatial intensity is recorded from which an image of the X-rayed object is subsequently reproduced.

This invention further discloses that a spatially coded shadowgraph may be formed by using a plurality of fluorescent coded sources having different predominant energy level regions, produced for example by different fluorescent materials and shadowgraphs derived therefrom subtracted to produce an image of an object which has a preferential absorption agent concentrated in selected portions of said object that absorbs radiation at the energy level of one of the fluorescent sources to a substantially greater degree than at the energy level of the other fluorescent sources. Thus, radiation shadows from surrounding portions of the object may be cancelled to produce contrast enhancement of the portions of the object containing the selective agent absorption.

This invention further discloses that images of the object may preferably be reconstructed optically if the coded source pattern comprises at least a portion of a Fresnel zone pattern in which concentric rings of equal area alternate between regions containing X-rays and regions containing substantially no X-rays. More specifically, in accordance with the principles of copending application Ser. No. 250.224, the source is preferably an off-center section of a Fresnel zone, and an additional mask, or half-tone screen, provides an average spatial frequency higher than the average spatial frequency of the zone pattern, and preferably provides a substantially constant spatial frequency pattern which provides the coded pattern with a carrier frequency to shift the spatial frequencies of the object to be X-rayed such that a larger portion of the frequencies are more effective in carrying the informational content of the spatial frequencies modulated on the coded patterns by the details of the object being X-rayed.

The operation of the zone plate X-ray system can be understood by considering a simple object such as a pinhole. Then the X-ray image on the detecting film is just a pinhole image of the zone plate source and has the essential components of a hologram of the pinhole, although it was formed by geometric shadowing rather than by diffraction as in ordinary optical holography. Reconstruction or decoding may be accomplished by illuminating the developed film with a convergent laser beam and using an iris to select a single diffraction order. The focal spot is then the reconstruction of the pinhole.

If the object is a double pinhole, the exposure on the film is two overlapping zone plates, but the reconstruction consists of two non-overlapping foci.

A more general object can be imaged by covering it with a half-tone screen, breaking the object up into an array of pinholes. The half-tone screen is desirable because the source being an off-center section of a Fresnel zone contains a band of spatial frequencies, not including very low spatial frequencies. Without the half-tone screen, only the edges of objects are well imaged while broad, continuous areas appear faintly or not at all. While an on-axis zone plate can be used with or without the half-tone screen, the off-axis pattern facilitates separation of the various diffraction orders and the undiffracted light during optical reconstruction of the image.

This invention further discloses that secondary radiation such as fluorescence or Compton scattering from the object being illuminated with X-rays and/or portions of the apparatus supporting the X-ray camera or other detection system are not spatially coded and, hence, may be made to substantially cancel during reconstruction of an image from the detected hologram.

In addition, since the light which may be directed through a transparent film derived from the detected patterns during a reconstruction process may be of any desired intensity, amplification of the image may be made to occur by increasing said intensity so that the radiation dosage applied to an object to be imaged, such as a living person, may be minimized.

DESCRIPTION OF THE DRAWINGS

Other objects and advantages of the invention will become apparent as the description thereof progresses, reference being had to the accompanying drawings wherein.

DESCRIPTION OF THE PREFERRED EMBODIMENT

Figure 1:
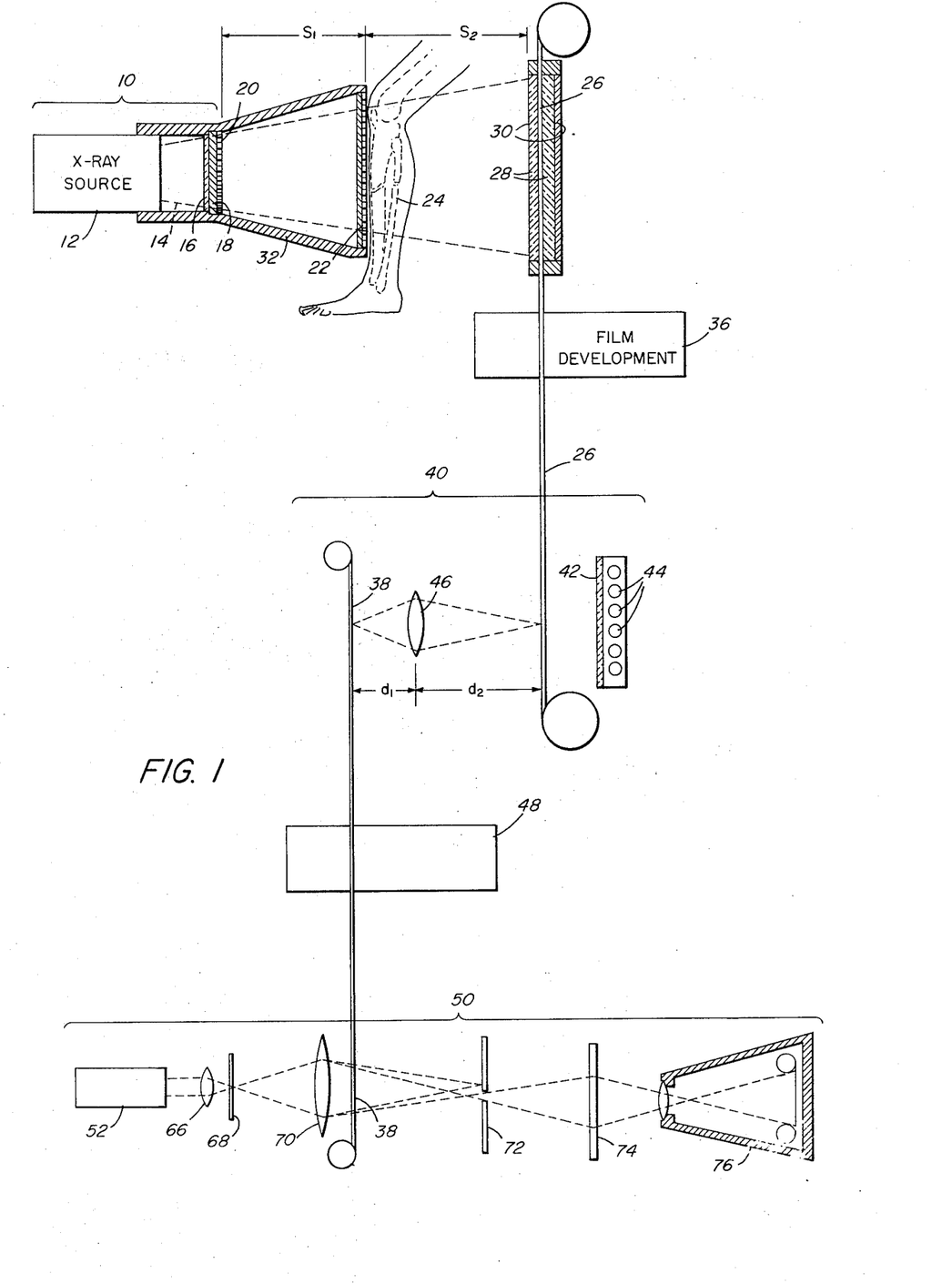
FIG. 1 illustrates an embodiment of the invention wherein a spatially coded fluorescent source of X-rays illuminates an object which casts a shadow on a detector to produce a shadowgraph from which an image is reconstructed by the use of a coherent light source.

Referring now to FIG. 1, there is shown a coded X-ray source 10 which provides a spatially coded pattern of X-rays. The source 10, as illustrated herein by way of example, has a source of X-rays 12 which may be a conventional tube providing a wide pattern of X-rays 14 from a large tube anode area. X-rays 14 strike a layer 16 of fluorescent material which reduces the energy level of higher energy X-rays to provide an emission within a substantially narrow energy level range where energy level is the energy per quantum of radiation. While X-ray fluorescence is well known, heretofore they were not used in practical imaging systems since the intensity, which is total radiation per unit area, of fluorescent X-ray emission is limited and X-ray sources were required to be high intensity point sources for satisfactory definition of the object being X-rayed. However, in accordance with this invention, by providing a source of X-rays which is distributed spatially in accordance with a predetermined code large areas of low intensity X-ray material may be used in the fluorescent X-ray mode to produce any desired magnitude of total radiation.

Figure 2:
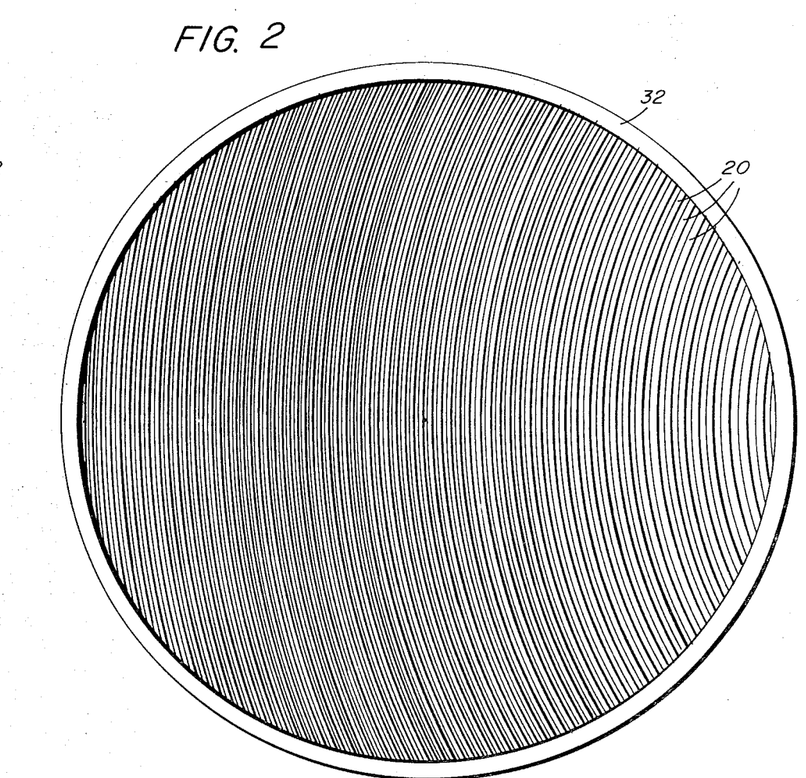
FIG. 2 illustrates a spatial coding pattern of a zone plate used to form the spatially coded source in FIG. 1.

Positioned adjacent to fluorescent layer 16 is a zone plate backing member 18 of X-ray transparent material such as aluminum on which is deposited a zone plate layer 20 of X-ray absorbing material, such as lead, which has portions thereof machined off to form a spatially varying periodic pattern to provide the spatial coding of the X-rays. While for optical reconstruction of the X-ray image an off-center section of a Fresnel zone pattern shown in FIG. 2 is preferable, any desired spatial coding pattern may be used.

Spaced from the zone plate 18 by a distance $S_1$ is a half-tone screen 22 formed in a fashion similar to zone plate 18 by depositing a layer of lead on a backing plate of aluminum and removing portions by any desired means such as photoetching or machining. Half tone plate 22 is, as illustrated herein by way of example, spatially periodic structure having preferably the pattern shown in FIG. 3 and performs the function of breaking up the larger spatial areas of the source into a series of smaller spatial sources of X-rays so that the spatial pattern formed by the zone plate is a modulation pattern in which the spatial frequency of the half-tone plate 22 is the carrier frequency and the spatial frequencies of the object may be regarded as sideband frequencies. The output of the half-tone screen 22 is thus a spatially coded pattern of X-rays with all of the undesired portions of the X-ray spectrum both as to energy level and as to spatial frequency having been substantially absorbed by the lead layers in the zone plate 18 and the half-tone plate 22. Thus, the dosage received by the object being imaged is not substantially greater than that necessary to convey the information to be imaged.

An object to be imaged, illustrated herein as a human leg 24 having a broken bone, is positioned preferably directly adjacent to the half-tone screen 22 such that the spatially coded X-ray pattern passes through the object 24 and produces a shadowgraph on an X-ray recording film 26. As shown herein, film 26 is in reel form to indicate the various process steps preferably used in reconstructing the image. However, film 26 can be in any desired form of a cassette or a plate which is removed and developed in accordance with well-known practice.

In order to increase the conversion of X-ray energy striking the film 26 to expose the film, plates 28, of any well-known material such as calcium tungstate, are positioned on either side of the film 26. Plates 28 convert high energy levels such as X-rays into scintillations of light thereby aiding in the exposure of the film 26. The optimum thickness of the plates 28 depends on the material used, amount of energy to be captured, and the definition of the image which is desired. In general, the maximum definition is controlled by the fineness of the grain structure of the film and the fineness with which the spatial pattern and/or half-tone pattern in masks 18 and 22 can be fabricated.

If desired, the surfaces 30 of the plates 28, which are opposite to those contacting the film 26, may be coated with a reflecting material to further capture all the scintillations of light produced by the X-rays. In general, film 26 is preferably of good quality commercial X-ray film with as much sensitivity as practicable.

The pattern recorded on the film may be regarded as generally of the form of an X-ray spatially coded intensity shadowgraph in which the distance $S_1$ between the spatial coding plate 18 and the object and the distance $S_2$ between the object being imaged 24 and the recording film 26 is preferably chosen to facilitate constructing an image from the data recorded on film 26.

Since difference distances produce different patterns, the data recorded on the film 26 will contain three-dimensional data. The data recorded on the film 26 is generally in spatially coded data form where spatially coded data is defined as the identifying of each item of data intelligence of an image with a spatial code. This type of recorded information may be then reconstructed either as any one of the slices through the object or, if preferred, as a three-dimensional image.

Figure 3:
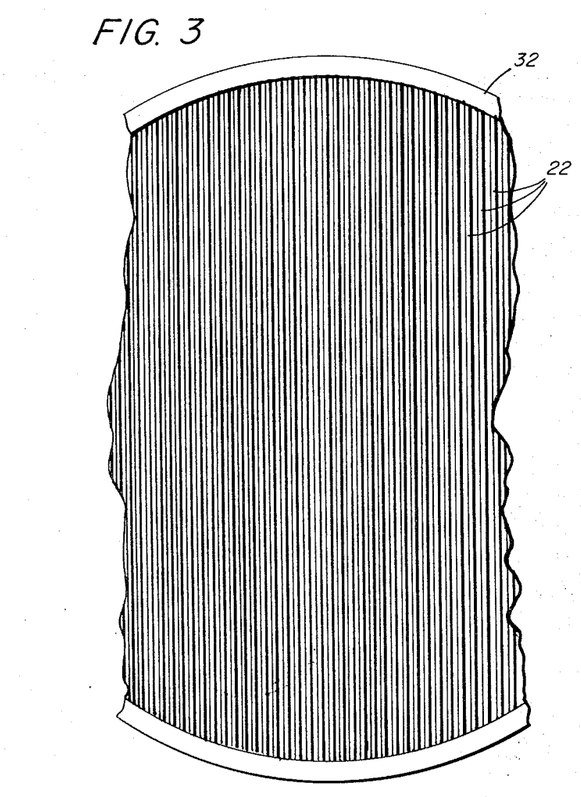
FIG. 3 illustrates the pattern of a half-tone screen pattern used to provide a spatial carrier in the system of FIG. 1.

The pattern of zone plate 18 is illustrated in FIG. 3 and is shown as an off-center section of a Fresnel zone pattern defined by the well-known formula $r_n = r_1 \sqrt{n}$. The zone plate center offset from the Fresnel pattern center is shown as being one diameter of the zone plate, but any desired offset could be used. The half-tone screen 22 is illustrated in FIG. 3, the half-tone screen 22 being larger than the zone plate 18 since radiations emanating from the zone plate 18 diffuse or disperse over a substantial angle. Radiations emanating beyond the desired angle may be contained by a cone illustrated diagrammatically at 32 in FIG. 1.

The thickness of the lead of zone plate 18 and half-tone screen 22 is chosen dependent on the energy level emanating from the fluorescent plate 16. For example, when conventional X-rays of the type illustrated herein at the lower end of the X-ray spectrum are used, the lead thickness may be 25 to 250 micrometers. In general, the lead region should produce a substantial amount of shading in the pattern but need not completely absorb all the X-ray emission impinging on the lead portions of the mask.

Figures 4, 5:
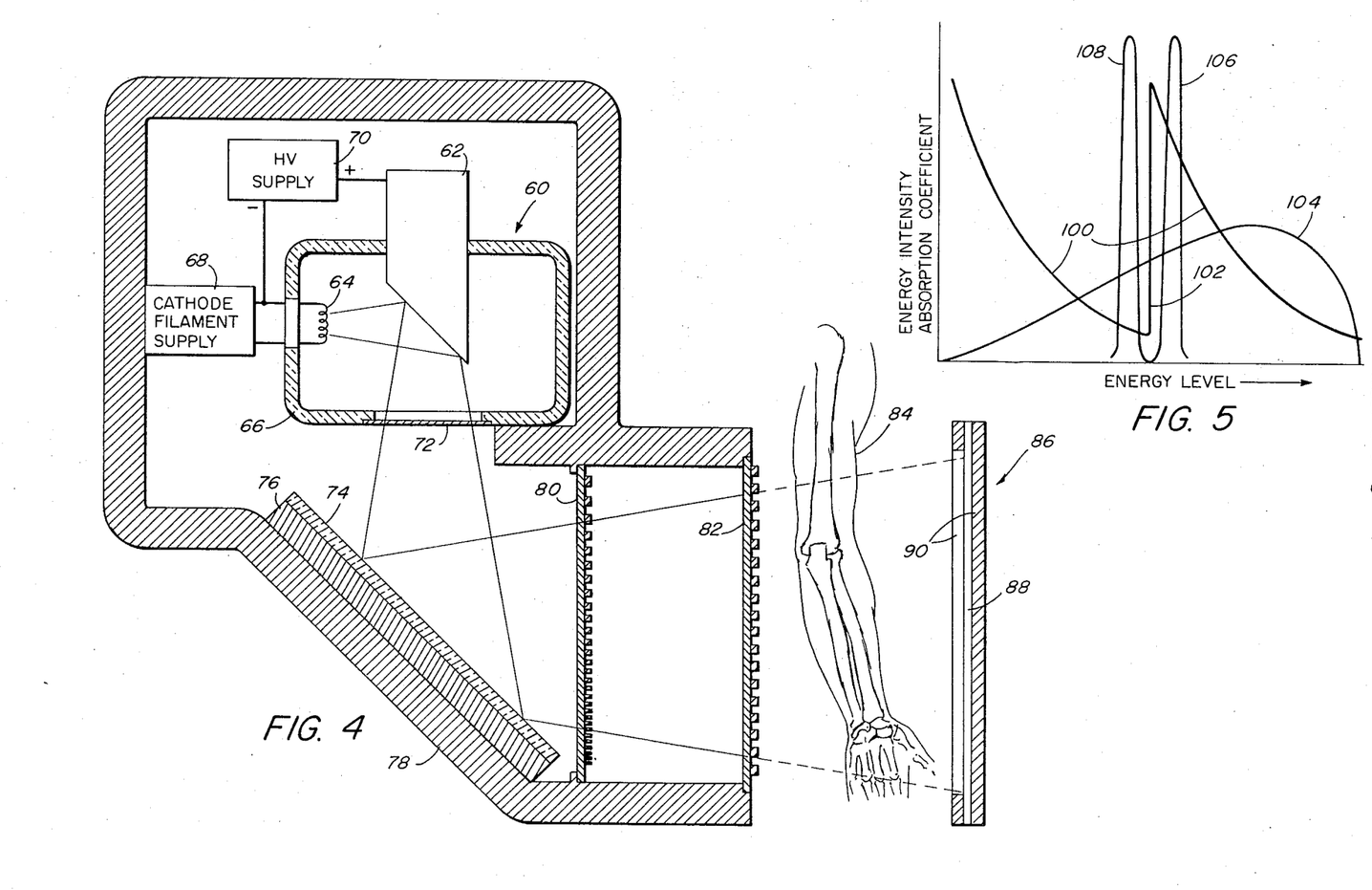
FIG. 4 illustrates a further embodiment of the invention.
FIG. 5 illustrates a graph of the energy level versus absorption coefficient and total energy intensity during various modes of operation of the invention.

In operation, energization of the X-ray source 12 produces X-rays of a wide range of energy levels as shown for example by curve 104 in FIG. 5 which, in accordance with one mode of operation of this invention with plate 16 removed, may be used to form coded shadowgraphs on detector 26. Plate 16 when used will absorb X-rays in the higher energy level of curve 104 and in turn re-emit X-rays, for example, as curves 106 or 108 of FIG. 5 depending on the material of plate 16. While any desired material can be used for X-ray fluorescence, elements or compounds of elements at or heavier than molybdenum are preferred for medical applications.

The fluorescent X-rays emanating from plate 16 pass through the zone plate 18 and half-tone screen 22 such that the spatially coded X-ray pattern impinging on the object 24 is effectively a spatial carrier frequency having the coded spatial frequency information on the object appearing above and below the carrier. In accordance with well-known practice, portions of the object 24, such as the bone, absorb larger amounts of X-rays than the flesh portions so that the shadow cast on film 28 comprises a spatial carrier having spatial sidebands which contain spatially the informational content of the location of the various structures within the object 24. The film 28, which may be, if desired, slightly pre-exposed or pre-fogged by an X-ray or light source to increase sensitivity, is passed through a conventional film development process illustrated by the box 36. This film may, if desired, be exposed directly with an image reconstructing process or, preferably as illustrated herein, may be transferred to a somewhat thicker film illustrated at 38 by means of a transfer system 40 which also may reduce the size of the image. More specifically, the transfer system comprises a light source made up of a ground glass screen 42 behind which are positioned a plurality of lights 44 so that a diffused light is passed through the film 26. The light passing through the film 26 is focussed on the second film 38 by means of a lens 46 whose focal length and relative spacings $d_1$ and $d_2$ between the film 38 and the lens 46 and between the lens 46 and the film 26, respectively, are chosen to transfer a reduced size image from film 26 to film 38. The film 38 which may be a slow speed film, since the transfer process may use as much light and take as long as is necessary, is then developed and bleached by conventional means in develop and bleach equipment illustrated at 48. The film 38 is developed to substantially the same or a greater extent as that of film 26 and is bleached by any conventional film bleach to convert all of the light absorbing regions in the film 38 to a compound having a thickness and/or index of refraction different from other regions of the film. In addition to enhancement of light transmission, bleaching converts the shadowgraph or amplitude pattern recorded by the film from the spatially coded X-ray pattern of noncoherent radiation into phase modulating patterns suitable for coherent light image reproduction, and the size reduction of the image is chosen to further enhance the sensitivity and clarity of the reproduced image.

The film 38 may then be used to produce an image of the bone structure in the leg 24 by any desired means such as the projection system 50 which projects coherent light from laser 52 through the film 38. It is to be clearly understood that the film 38 is shown on a roll by way of indicating the process sequence only and that individual plates of film could be used. The coherent light from laser 52, which may be a conventional helium-neon laser or any other desired coherent or substantially coherent light source, is focussed through a lens 66 and a pinhole iris 68 to remove spatial noise. The light is then focussed by means of a lens 70 through the film 38 on an apertured plate 72 positioned in the Fourier or focal plane.

Film 38 diffracts the informational content of the picture away from the center line of the pinhole and lens system 50 by a distance $r_c$ so that it passes through a hole having a diameter $d$ in a plate 72 and appears as a reconstructed image in an image plane on any desired detection system such as a ground glass screen 74. The distance of screen 74 may be varied with respect to the film 58 to produce from the pattern recorded on film 38 various slices corresponding to various distances $S_2$ of the object from the detector system 36. The ratio of the aperture size $d$ and its offset $r_c$ is preferably substantially equal to the ratio of the diameter of the zone plate pattern to the distance which the center of the zone plate pattern of FIG. 4 is offset from the center of the Fresnel zone pattern. For example, if the diameter of the zone plate is equal to the offset of the center of the zone plate from the center of curvature at the zones, the aperture size d in the iris plate 72 is equal to the offset distance $r_c$ from the center line of the optical system. As illustrated herein, the iris plate 72 is positioned substantially in the plane where the pinhole light from iris plate 72 would be focussed by the lens 70 in the absence of film 38. It should be noted that small effects occur due to the film 38, and the precise positioning of iris plate 72 may be adjusted for optimum results.

The image produced on screen 74 may be viewed directly and/or several pictures taken for various positions of screen 74 by means of a camera 76. Alternatively, a television pickup camera may be used to view the reproduced image and/or to store images in a computer memory from which, if desired, simultaneous three-dimensional views of the object 24 may be reproduced. In accordance with this invention, the film 26 may be sufficiently thick for a given exposure time for such complete recording to occur without saturation since the portions of the film which are more completely exposed simply remain transparent to light in the reduction process. It should be noted that those portions which are still transparent pass the most light so that the reduced film 38 is a negative of the original film 26 causing a greater darkening of the negative 38. However, this also does not result in reduction in image intensity since all of the opaque regions are bleached and the net result is simply a small average increase in the refraction of the film. From the foregoing it may be seen that, by reason of the substantial signal amplification obtained by the reduction size of the film and the bleaching, this system may be used without light amplification prior to recording and under conditions where the definition of the image results primarily from the total number of X-rays recorded which is a function of the time of exposure of the detecting system.

The fineness of the half-tone screen and the finest line of the zone plate may be made substantially as fine as it is practical to fabricate such structures while still projecting patterns on the detecting surface which are within the spatial frequency pass band of the detecting system. Thus, a high definition shadowgraph of an object may be produced using a coded source under conditions from which an image may be constructed using coherent light in the image forming process.

Referring now to FIG. 4, there is shown another embodiment of the invention in which energy purity of the X-rays is enhanced, such enhancement being particularly useful where high definition images are desired since among the limiting factors in definition is the narrowest spacing between substantially opaque elements of the zone plate and/or half-tone screen. By using fluorescence in which X-rays which go through the fluorescent target without being converted to fluorescent energy levels are absorbed without substantially impinging on the detecting medium, substantial improvement can be obtained. In addition, in those applications such as, for example, enhanced preferential absorption by areas of a body, improved results may be obtained by increasing the purity of the energy range, that is, by restricting it to a narrow band. For example, in angiography in which a contrast agent such as iodine is placed in the blood stream of a patient and a K-line is chosen slightly above the energy level of the sharp absorption increase of iodine, the less X-ray energy to which the patient is subjected, both substantially above and below the absorption discontinuity or edge, the deeper the arteries and/or veins can be in the patient without spurious informational signals produced by other portions of the body interfering and/or masking the informational content of the artery shadowgraph in the reconstructed image. In addition, such purity becomes desirable when it is desired to make images by subtracting a detected pattern obtained using an X-ray source whose energy level is slightly below the absorption edge of the preferential absorbing agent from the detected pattern produced by an energy level slightly above such absorbing agent's edge to thereby further enhance the detail of those portions of the body having the selective absorbing agent. In addition, since X-ray energy higher than that which the zone plate and/or half-tone screen will absorb produces no useful image in the spatially coded pattern of this invention, its presence needlessly subjects the patient to an additional dosage of potentially harmful radiation.

In this embodiment of the invention, the X-ray source is shown diagrammatically as a conventional X-ray tube 60, which may be any standard commercially available X-ray tube, having an anode 62 and a cathode 64, both of which may be, for example, tungsten, having their active portions enclosed within an evacuated envelope 66. When the cathode 64 is heated, for example, by a cathode filament supply 68 and a suitably high voltage of, for example, 100 to 150 kv is connected between the anode 62 and the cathode 64, for example, by a high voltage supply 70, electrons from the cathode 64 strike the anode 62 with sufficient velocity to produce a wide range of X-rays, the majority of which having an energy level above the fluorescent K-line of a wide range of materials, such as barium and cerium, which are useful for medical diagnostic purposes. The X-ray tube 60 then emits X-rays in a direction at an angle to the anode surface on which the electrons impinge and the X-rays are radiated through a window 72 of suitable material, such as beryllium. Since a conventional X-ray tube normally has the electrons focussed on a sharp point on the anode in order to produce a sharp image on a conventional film, heating of that spot limits the total X-ray energy available from the tube. In the present invention focussing of the electrons to a sharp spot is not necessary since the X-ray source is being spatially coded and, accordingly, electrons can strike a wide area of the anode 62 to produce substantially larger X-ray intensities which are emitted through tube window 12. As illustrated herein, the X-rays strike a planar member 74 comprising a layer of X-ray fluorescent material supported by a backing member 76 of X-ray absorbing material such as lead, the surface of planar member 74 being, for example, at an angle on the order of 45° to the average direction of motion of the X-rays from anode 62. Layer 74 may be, for example, of barium or cerium or any of the other well-known X-ray fluorescent materials. Backing member 76 may be a portion of or, as shown, supported by an X-ray absorbing housing or shield 78 surrounding the X-ray tube 60. As a result, X-rays from the tube 60 which strike the fluorescent surface 74 having an energy level above the K-line of the particular material of the surface 74 will produce a fluorescent K-line radiation from the surface of layer 74, a portion of which will pass through an aperture in housing 78 containing spatial coding zone plate 80, for example, of the type shown in FIG. 2, and through a half-tone screen 82, for example, of the type shown in FIG. 3, X-radiations from tube 60 striking fluorescent layer 74 which are not converted to fluorescent K-lines in general pass through the layer 74 and are absorbed by the backing layer 76 and do not pass through the zone plate 80 and/or half-tone screen 82. Hence, such radiations above the fluorescent K-line do not appear at the output of the spatially coded source thorugh half-tone screen 82 so that the source available for irradiation of the patient is a high purity spatially coded source. It is to be clearly understood that various geometries may be devised for producing such purity, the embodiment illustrated in FIG. 4 being by way of example only, and many modifications of the position and shape of the fluorescent element, the zone plate and/or the half-tone screen may be used.

The coded fluorescent radiation is then used for any desired purpose, such as that illustrated in which an object 84 is positioned adjacent to the half-tone screen 82 and a detecting structure, such as a film cassette 86 which may include a film 88 and energy conversion plates 90 similar to those described in FIG. 1, is spaced from the object in accordance with the distances disclosed in connection with FIG. 1 whereby tomographic intensity patterns may be recorded on the film.

Referring now to FIG. 5, there is shown a plot of an example of the energy level emitted from an X-ray tube, the absorption coefficient of an absorbing agent, and the fluorescent K-line of substances on either side of the absorption edge of the absorbing agent in which structures of the type shown in FIGS. 1 through 4 may be used to produce subtraction of spatially coded images from energy levels above and below the absorption edge of the absorbing agent.

In operation the object to be imaged has a selective agent such as iodine introduced thereinto which associates with the particular organ to be imaged. As is well known, iodine has an absorption coefficient which is high for very low energy levels and decreases along a generally sawtooth wave shape to a low level, at which point the absorption coefficient rises sharply to a high value as shown in curve 100 which, at a particular energy level, rises sharply as indicated at 102 to form what is called an absorption edge below which absorption is very low and above which absorption is very high.

The energy output or energy intensity which is plotted along the same axis as the absorption coefficient in FIG. 5 versus energy level of the beam elements results in a curve for a typical X-ray tube, as shown for example at 104, in which sufficient voltage is supplied between the anode and cathode so that the major portion of the energy content of the X-rays is above the absorption edge of the particular material selected as the absorption agent. If an image is to be reproduced of an object from a fluorescent coded source, the fluorescent material is chosen with a K-line above the absorption edge and when excited by the X-ray energy from tube 60 will produce a substantially sharp or narrow energy level band of X-rays as indicated by curve 106. Since curve 106 lies in the high absorption region of the absorption agent, the spatially coded pattern detected by either the structures of FIG. 1 or FIG. 4 can produce high degrees of contrast between the regions of the body in which the absorption agent is concentrated and the other regions of the body which absorb substantially smaller portions of the X-rays emitted from the fluorescent coded source.

When it is desired to further enhance the contrast between the regions which have absorbed the selective agents and other regions of the body, an energy pattern from a second fluorescent K-line produced by material lying below the absorption edge 102 is subtracted from the pattern produced by energy from curve 106. For this purpose, a second type of fluorescent material is used which produces a fluorescent energy level when excited by energy of the pattern of curve 104 which lies below the absorption edge 102, as shown for example by curve 108. This pattern may be subtracted from the previous pattern in any desired fashion, either simultaneously or time sequentially and by electronic means or otherwise and during or after detection of the pattern so that the pattern produced by the energy of curve 108 which is absorbed by the agent of curve 100 to a very small extent, that is, to substantially the same extent as other portions of the body not containing the absorption agent are subtracted from the pattern produced by the curve 106.

For example, subtraction may be achieved in the following fashion. A film 88 is exposed through an object 84, such as a patient having iodine in the blood stream, with a first zone plate pattern 80 and a first fluorescent layer material 74, such as barium or a barium compound such as barium oxide having the fluorescent X-ray emission curve 108, the duration of exposure being sufficient to produce substantial development of the film without substantial saturation of any regions thereof. The barium fluorescent plate is then replaced with a second plate of a lower energy level such as cerium having the fluorescent X-ray emission curve 106. A second film is then recorded through the object 84 and both films are developed in accordance with the teaching of FIG. 1. Subtraction of the two films is then achieved by forming a negative of one of the films by conventional one-to-one exposure of a third film through, for example, the second film and the third film is developed and accurately superimposed on the first film. A fourth film corresponding to the film 38 of FIG. 1 is then exposed with the suitable size reduction through the composite of the first and third films so that the subtraction of the intensity pattern of curve formed energy curve 108 from the energy pattern formed from curve 108 is recorded in the film 38. Suitable size reduction is also undergone at this stage to enhance the subsequent reproduction of the image and film 38 is then developed and bleached as previously described in connection with FIG. 1. The resulting image which may be reproduced from the structure of FIG. 1 has the absorption agent pattern enhanced since, due to the subtraction process in addition in the particular steps of the process outlined above, both the negative and the positive of the films contribute informational content to the final picture so that an intensity improvement of 3 db or double the power may be obtained. Thus, the total exposure of the patient for the recording of each film may be substantially lessened so that the total exposure time for both films need not be substantially greater than the time for exposure of a single film without such subtraction and enhancement and, indeed, in many instances for a given clarity and definition the total exposure time of the patient may be substantially reduced.

This completes the embodiments of the invention illustrated herein. However, many modifications thereof will be apparent to persons skilled in the art without departing from the spirit and scope of this invention. For example, X-ray sources for the monochromatic X-rays could be radioactive sources. The fluorescent screen could itself be discrete regions of fluorescent material in the form of a zone plate. Also, the patient or object to be X-rayed could be made to produce fluorescent X-rays and, in this event, the zone plate and half-tone screen would be positioned between the patient and the detecting structure with the half-tone screen preferably being closest to the patient. In addition, various systems, such as the well-known Anger camera or image intensifier, could be substituted for the film 86 and real time viewing of the image could be used, examples of such structures being illustrated in the aforementioned copending applications. Accordingly, it is intended that this invention be not limited by the particular details of the embodiments illustrated herein except as defined by the appended claims.

What is claimed is:

1. In combination:
means for producing a substantially non-phase coherent spatially coded radiation pattern comprising a body emitting radiation predominantly concentrated around a predetermined energy level in response to radiation having an energy level above said predetermined energy level and a structure having a plurality of regions substantially permeable to said radiation separated by intervening differently spaced regions substantially less permeable to said radiation than said permeable regions, with the average thickness of said less permeable regions in a direction parallel to the average direction of propagation of said radiation being on the same order of magnitude as the average of said spacings in a direction transverse to said direction of propagation of said radiation;
means for spatially detecting said radiation pattern; and
means for deriving an image of an object from said spatial detecting means.

2. The combination in accordance with claim 1 wherein said predetermined energy level lies above the visible spectrum.

3. The combination in accordance with claim 1 wherein said predetermined energy level lies within the X-ray region of the spectrum.

4. The combination in accordance with claim 3 wherein said body emitting said predetermined energy level radiation comprises a solid region of X-ray fluorescent material.

5. The combination in accordance with claim 1 wherein said structure forms a spatially coded radiation pattern comprising at least a major portion of a Fresnel zone pattern.

6. The combination in accordance with claim 1 wherein said structure forms a spatially coded radiation pattern having a substantially spatially varying spatial frequency component and a substantially constant spatial frequency component.

7. The combination in accordance with claim 6 wherein said varying spatial frequency component of said pattern is comprised of an off-center section of a Fresnel zone pattern.

8. The combination in accordance with claim 1 wherein said means for deriving an image of an object comprises means for reducing the size of said detected radiation pattern.

9. The combination in accordance with claim 1 wherein said detecting means comprises a distributed medium for converting said radiation pattern to radiations of a lower energy level than said predetermined energy level.

10. The combination in accordance with claim 9 wherein said detecting means comprises:
a photographic film responsive to said lower energy level radiation.

11. In combination:
means for producing a beam of fluorescent X-rays spatially distributed in accordance with a predetermined pattern, at least a component of said pattern comprising at least a portion of a Fresnel zone pattern; and
means for spatially detecting portions of said pattern passing through an object to be X-rayed.

12. The combination in accordance with claim 11 wherein said pattern of fluorescent X-rays is comprised of a component having an average spatial frequency higher than the average spatial frequency of said zone pattern.

13. The combination in accordance with claim 11 wherein said fluorescent X-rays are produced by, or derived from, high speed electrons striking a solid body.

14. The combination in accordance with claim 13 wherein said electrons are produced in an evacuated X-ray tube containing said solid body.

15. The combination in accordance with claim 14 wherein said fluorescent X-rays are predominantly produced by fluorescent X-ray emission from material exposed to X-rays emitted by said solid body.

16. In combination:
means comprising an X-ray source for producing X-rays having an average energy level above a predetermined energy level;
means energized by said X-ray source for emitting fluorescent X-radiation predominantly concentrated around said predetermined energy level; and means for producing a spatially distributed pattern of said fluorescent X-radiation comprising a structure exposed to said fluorescent X-radiation emitted from said material and having a plurality of regions substantially permeable to said fluorescent X-radiation separated by intervening differently spaced regions substantially less permeable to said fluorescent X-radiation than said permeable regions, with the average thickness of said less permeable regions in a direction parallel to the average direction of propagation of said fluorescent X-radiation through said permeable regions being not substantially greater than the average of said spacings in a direction transverse to said direction of propagation of said fluorescent X-radiation.

17. The combination in accordance with claim 16 wherein said X-ray source comprises an electron source and a target electrode surface within an evacuated region.

18. The combination in accordance with claim 17 wherein said X-ray source comprises means for directing electrons from said electron source to said target at velocities producing X-radiation from said target at X-ray energy levels predominantly above said predetermined energy level.

19. The combination in accordance with claim 16 wherein said less permeable regions comprise material for absorbing portions of the fluorescent X-rays passing therethrough in accordance with a spatially coded pattern having a spatially varying frequency component.

20. The combination in accordance with claim 18 wherein said X-ray source comprises an X-ray tube and said means for producing said pattern comprises first means for spatially masking said fluorescent X-rays to form a first spatially varying spatial frequency component of a pattern, and second masking means spaced from said first masking means to produce a second spatial frequency component of said pattern.

21. In combination:
a spatially extensive source of fluorescent X-rays; and means for spatially coding said X-rays comprising a structure having a plurality of regions substantially permeable to said radiation separated by intervening differently spaced regions substantially less permeable to said radiation than said permeable regions, with the average thickness of said less permeable regions in a direction parallel to the average direction of propagation of said radiation being on the same order of magnitude as the average of said spacings in a direction transverse to said direction of propagation of said radiation.

22. The combination in accordance with claim 21 wherein said source comprises:
a source of X-rays having an energy level predominantly higher than the energy level of said fluorescent X-rays; and
a body of X-ray fluorescent material exposed to said predominantly higher energy level X-rays.

23. The combination in accordance with claim 22 wherein said source of X-rays having an energy level above the energy level of said fluorescent X-rays comprises an electron tube.

24. The combination in accordance with claim 21 wherein said regions of said structure form at least a portion of a Fresnel zone pattern.

25. The combination in accordance with claim 21 wherein said regions form an off-center section of a Fresnel zone pattern.

26. The combination in accordance with claim 21 and including a plurality of said structures spaced from each other along said direction of propagation.

27. The combination in accordance with claim 26 wherein at least one of said structures comprises at least a portion of a Fresnel zone pattern.

28. The combination in accordance with claim 26 wherein at least one of said structures comprises the off-center section of a Fresnel zone pattern.

* * * * *

UNITED STATES PATENT OFFICE
CERTIFICATE OF CORRECTION

Patent No. 3,801,785      Dated April 2, 1975

Inventor(s) Harrison H. Barrett

It is certified that error appears in the above-identified patent and that said Letters Patent are hereby corrected as shown below:

Column 1, line 5, after "1970" insert -- now U.S. Pat. No. 3748470 --.

Column 1, line 7, after "1972" delete "now U.S. Pat. No. 3748470".

Column 1, line 41, after "Ser. No. 77,459" insert -- now U.S. Pat. No. 3748470 --.

Signed and Sealed this

Twenty-first Day of November 1978

[SEAL]

Attest:

RUTH C. MASON
Attesting Officer

DONALD W. BANNER
Commissioner of Patents and Trademarks